(12) United States Patent
Kim et al.

(10) Patent No.: US 9,876,204 B2
(45) Date of Patent: Jan. 23, 2018

(54) BATTERY MODULE ASSEMBLY WITH NOVEL STRUCTURE

(71) Applicant: LG CHEM, LTD., Seoul (KR)

(72) Inventors: Juhan Kim, Daejeon (KR); Bum Hyun Lee, Daejeon (KR); Jun Yeob Seong, Daejeon (KR); Jin-Kyu Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 151 days.

(21) Appl. No.: 14/762,339

(22) PCT Filed: May 15, 2013

(86) PCT No.: PCT/KR2013/004292
§ 371 (c)(1),
(2) Date: Jul. 21, 2015

(87) PCT Pub. No.: WO2014/185567
PCT Pub. Date: Nov. 20, 2014

(65) Prior Publication Data
US 2016/0056427 A1    Feb. 25, 2016

(51) Int. Cl.
*H01M 2/10*    (2006.01)
*H01M 2/20*    (2006.01)
(Continued)

(52) U.S. Cl.
CPC ....... *H01M 2/1077* (2013.01); *H01M 2/1094* (2013.01); *H01M 2/20* (2013.01);
(Continued)

(58) Field of Classification Search
CPC .......................... H01M 2/1077; H01M 2/1094
(Continued)

(56) References Cited

U.S. PATENT DOCUMENTS

2009/0311581 A1    12/2009 Park et al.
2011/0115437 A1    5/2011 Kasai
(Continued)

FOREIGN PATENT DOCUMENTS

CN      101401229 A     4/2009
JP      2011-345082 A   12/2001
(Continued)

OTHER PUBLICATIONS

International Search Report issued in PCT/KR2013/004292, dated Feb. 17, 2014.

*Primary Examiner* — Basia Ridley
*Assistant Examiner* — James Erwin
(74) *Attorney, Agent, or Firm* — Birch, Stewart, Kolasch & Birch, LLP

(57) ABSTRACT

Disclosed herein is a battery module assembly including two or more battery modules, each of which includes two or more plate-shaped battery cells vertically stacked such that electrode leads of the battery cells are arranged in one direction, a base plate including module receiving parts, on tops of which the battery modules are loaded in a state in which electrode terminals of the battery modules are arranged in one direction, the base plate being provided at an outer edge thereof with upwardly bent side walls, an upper cover plate including downwardly bent side walls formed at opposite sides thereof on the basis of the electrode terminals of the battery modules, the upper cover plate being fixed on the base plate to form a top of the battery module assembly, and a plate-shaped assembly cover loaded on tops of the battery modules and coupled to the battery modules in a fastening fashion, the assembly cover including a cable fixing part for fixing a cable.

23 Claims, 15 Drawing Sheets

(51) Int. Cl.
  *H01M 2/02* (2006.01)
  *H01M 2/30* (2006.01)
  *H01M 10/48* (2006.01)

(52) U.S. Cl.
  CPC .......... *H01M 2/206* (2013.01); *H01M 2/0237* (2013.01); *H01M 2/30* (2013.01); *H01M 2/305* (2013.01); *H01M 10/482* (2013.01); *H01M 10/486* (2013.01); *H01M 2220/10* (2013.01)

(58) Field of Classification Search
  USPC .......................................................... 429/90
  See application file for complete search history.

(56) References Cited

U.S. PATENT DOCUMENTS

| | | | |
|---|---|---|---|
| 2011/0206948 A1* | 8/2011 | Asai | H01M 2/0473 429/7 |
| 2011/0223457 A1 | 9/2011 | Lee et al. | |
| 2012/0045665 A1* | 2/2012 | Park | H01M 2/1022 429/7 |
| 2012/0171527 A1 | 7/2012 | Hiroma | |
| 2013/0052487 A1 | 2/2013 | Park | |
| 2013/0115497 A1* | 5/2013 | Ertel | H01M 2/1077 429/99 |
| 2015/0162648 A1 | 6/2015 | Yang et al. | |
| 2016/0056425 A1 | 2/2016 | Kim et al. | |

FOREIGN PATENT DOCUMENTS

| | | |
|---|---|---|
| JP | 2006-185668 A | 7/2006 |
| JP | 2007-18881 A | 1/2007 |
| JP | 2007-200712 A | 8/2007 |
| JP | 2007-273143 A | 10/2007 |
| JP | 2008-166009 A | 7/2008 |
| JP | 2008-243412 A | 10/2008 |
| JP | 2009-529217 A | 8/2009 |
| JP | 2011-76871 A | 4/2011 |
| JP | 2011-100619 A | 5/2011 |
| JP | 2012-79666 A | 4/2012 |
| JP | 2012-94456 A | 5/2012 |
| JP | 2012-511802 A | 5/2012 |
| JP | 2013-55054 A | 3/2013 |
| JP | 2016-503228 A | 2/2016 |
| KR | 10-2007-0112489 A | 11/2007 |
| KR | 10-2012-0016354 A | 2/2012 |
| KR | 10-2012-0081821 A | 7/2012 |
| WO | WO 2007/105889 A1 | 9/2007 |
| WO | WO 2008/035875 A1 | 3/2008 |
| WO | WO 2010/008026 A2 | 1/2010 |
| WO | WO 2010/071292 A1 | 6/2010 |
| WO | WO 2011/045841 A1 | 4/2011 |

\* cited by examiner

[FIG. 1]
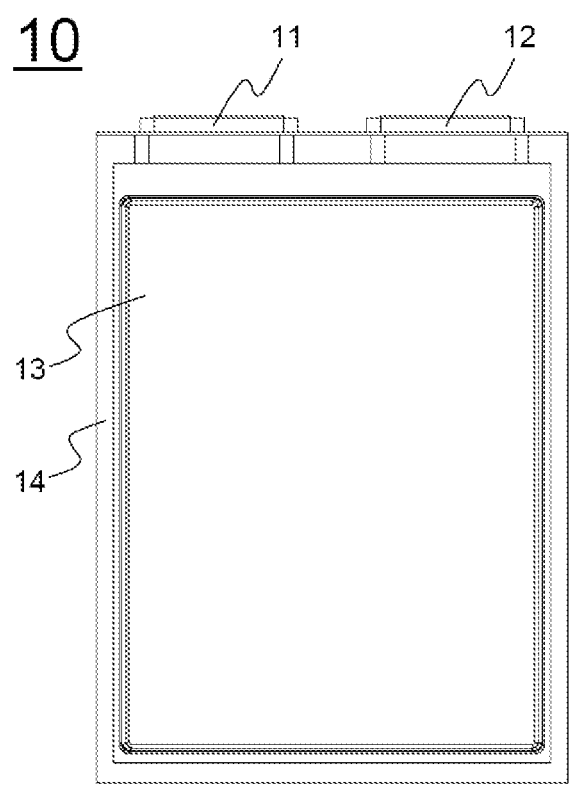

[FIG. 2]
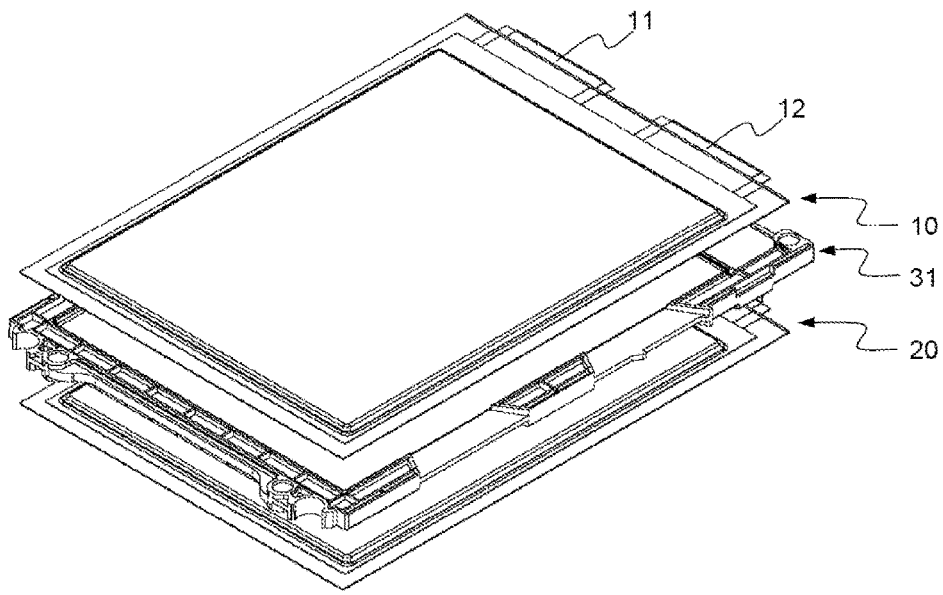
[FIG. 3]
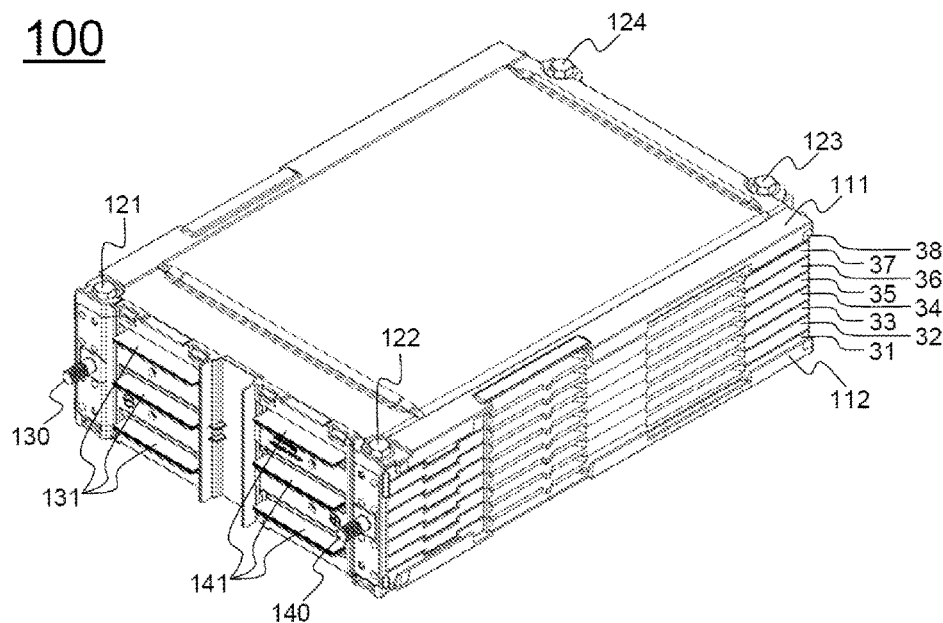

[FIG. 4]
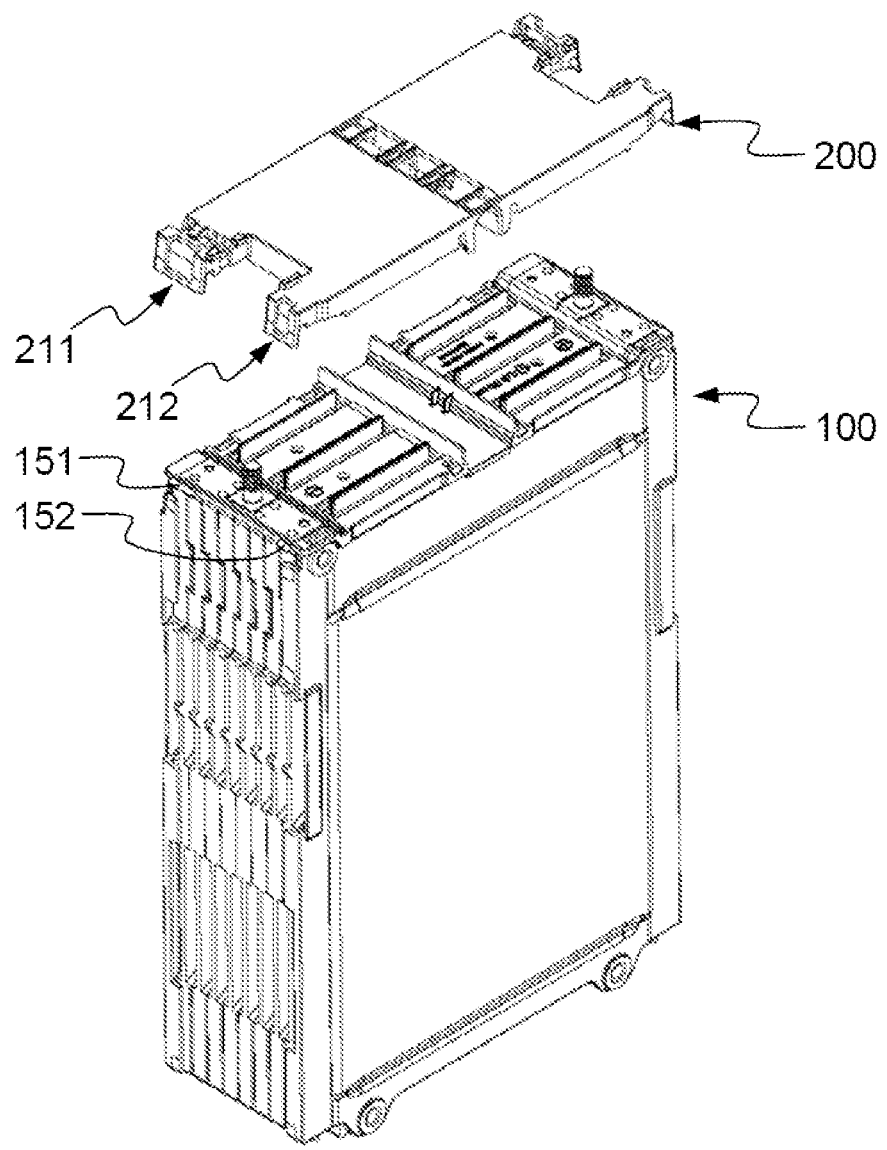

[FIG. 5]
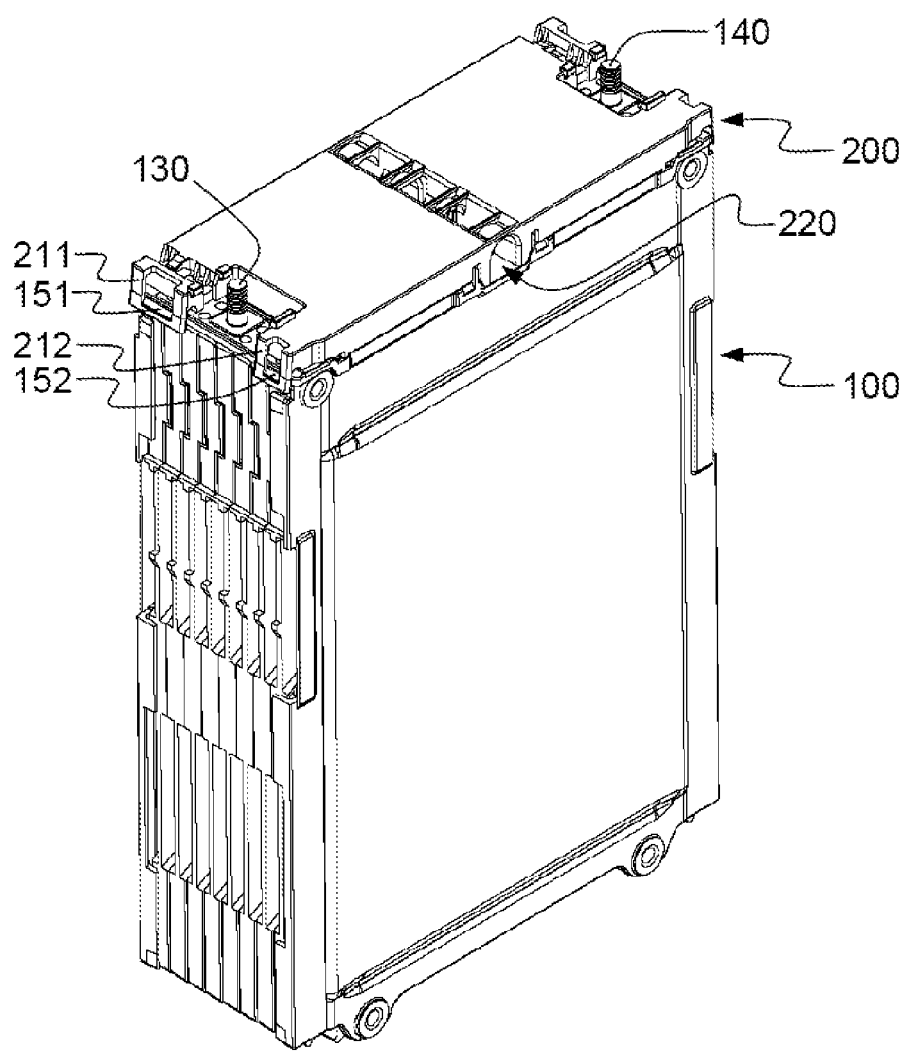

[FIG. 6]
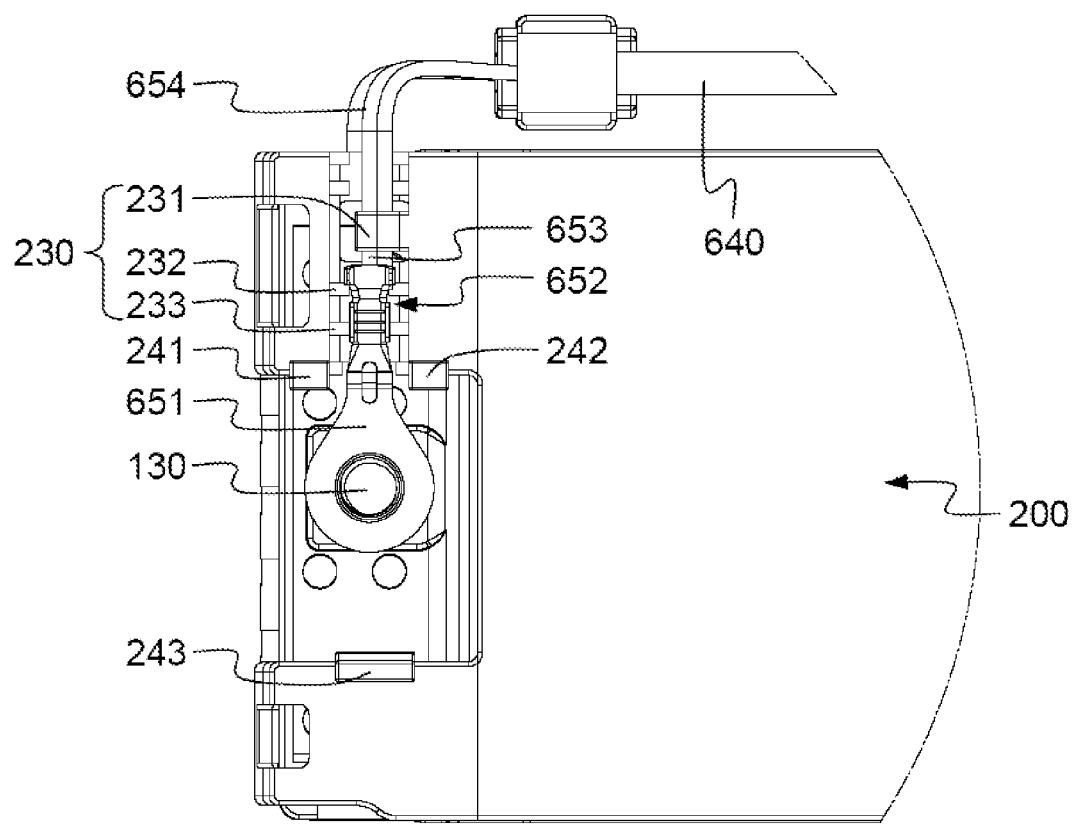

[FIG. 7]
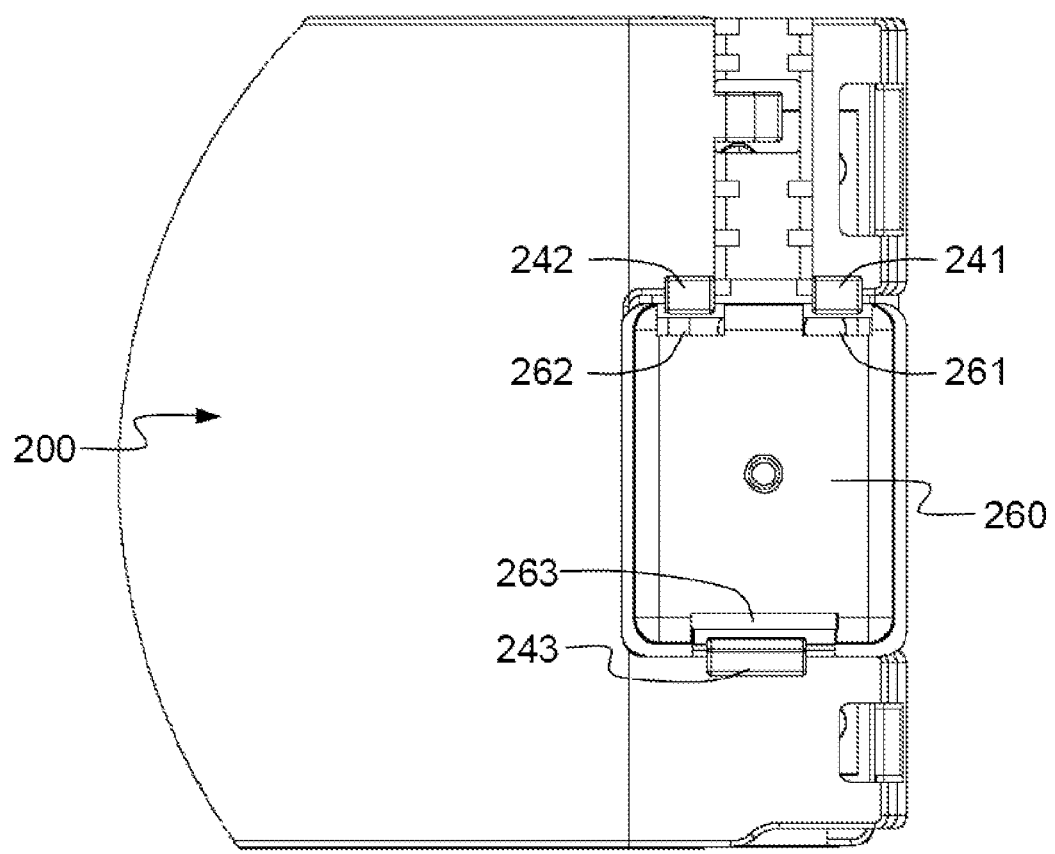

[FIG. 8]
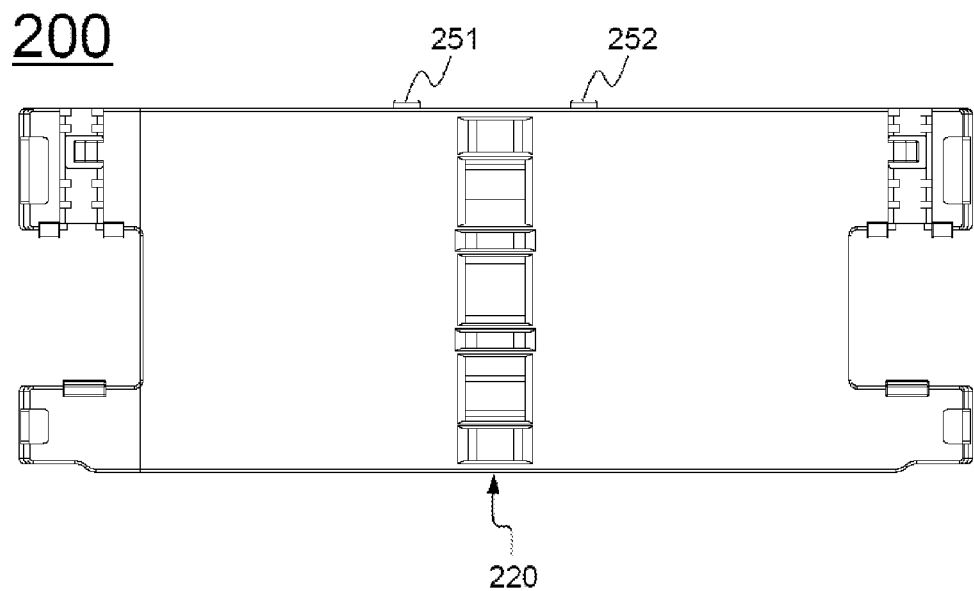

[FIG. 9]
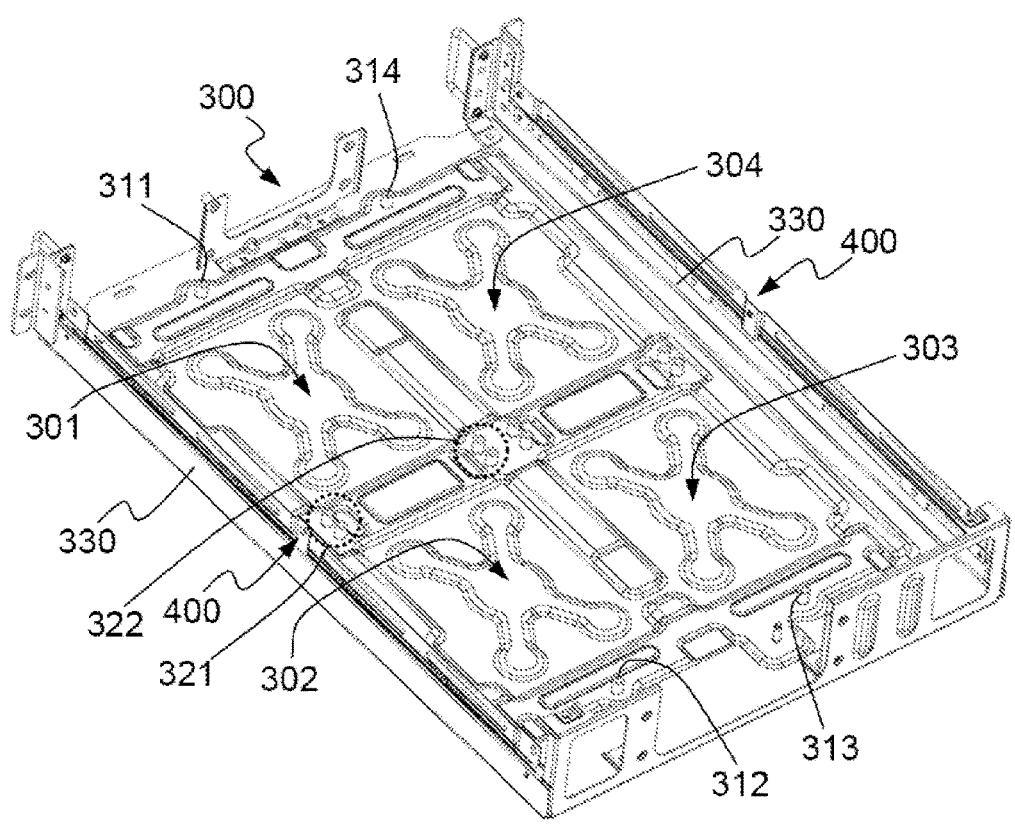

[FIG. 10]
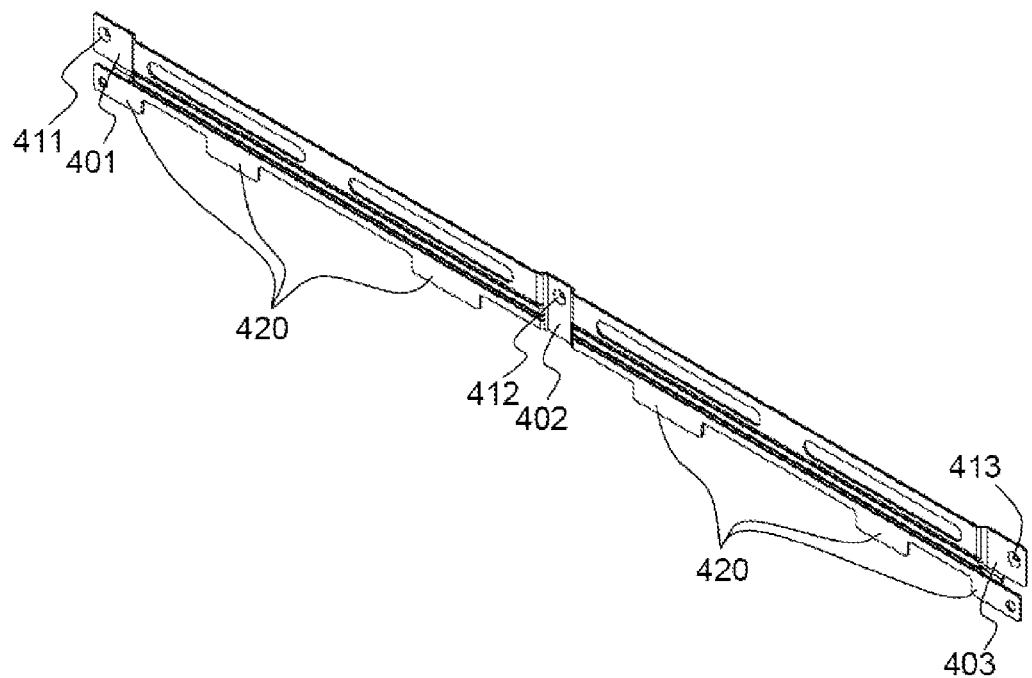

[FIG. 11]
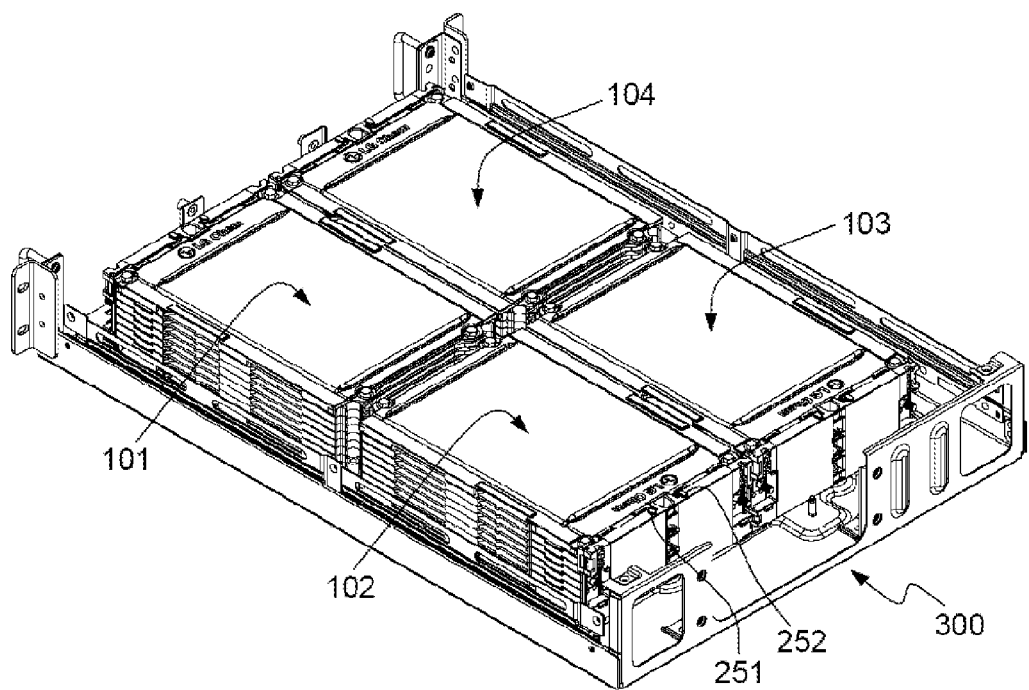

[FIG. 12]
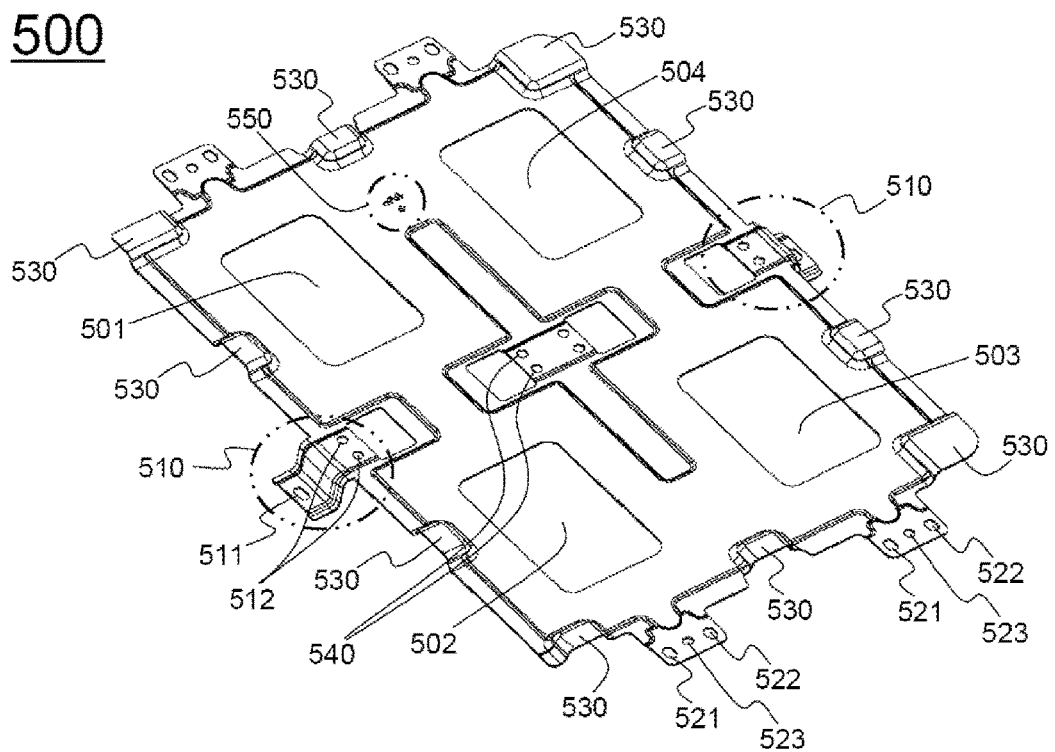

【FIG. 13】
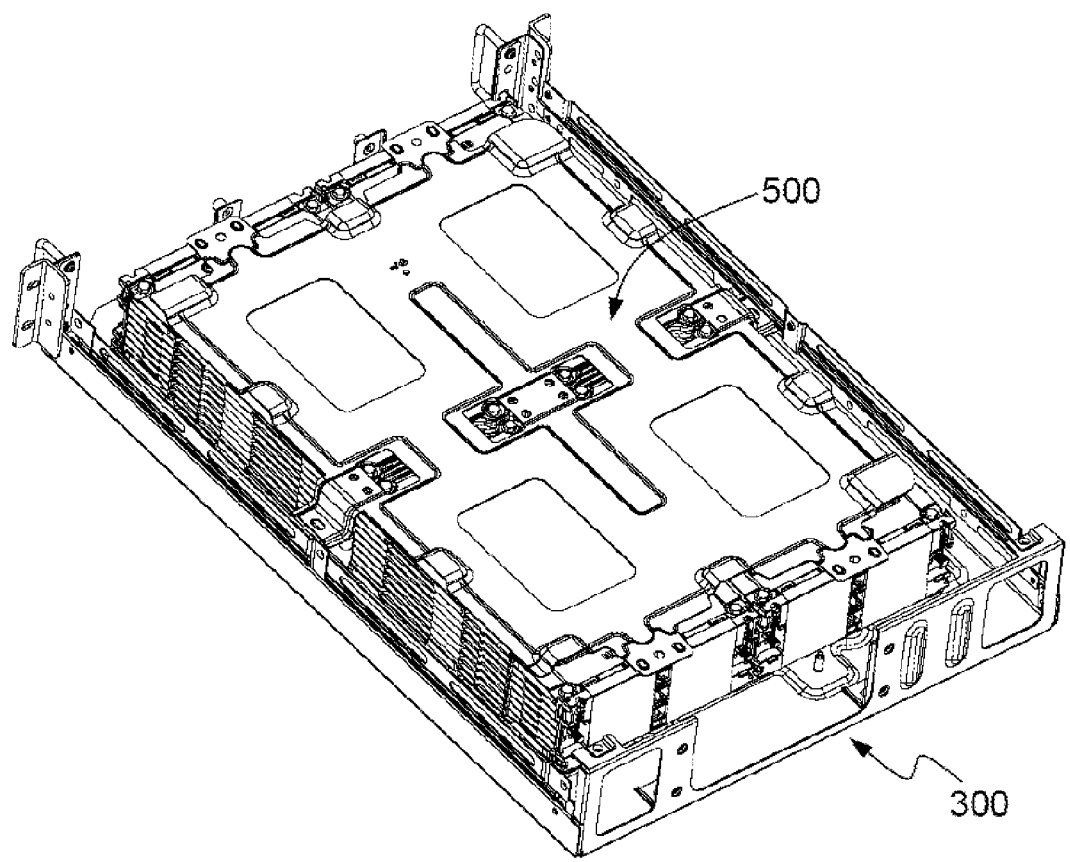

[FIG. 14]
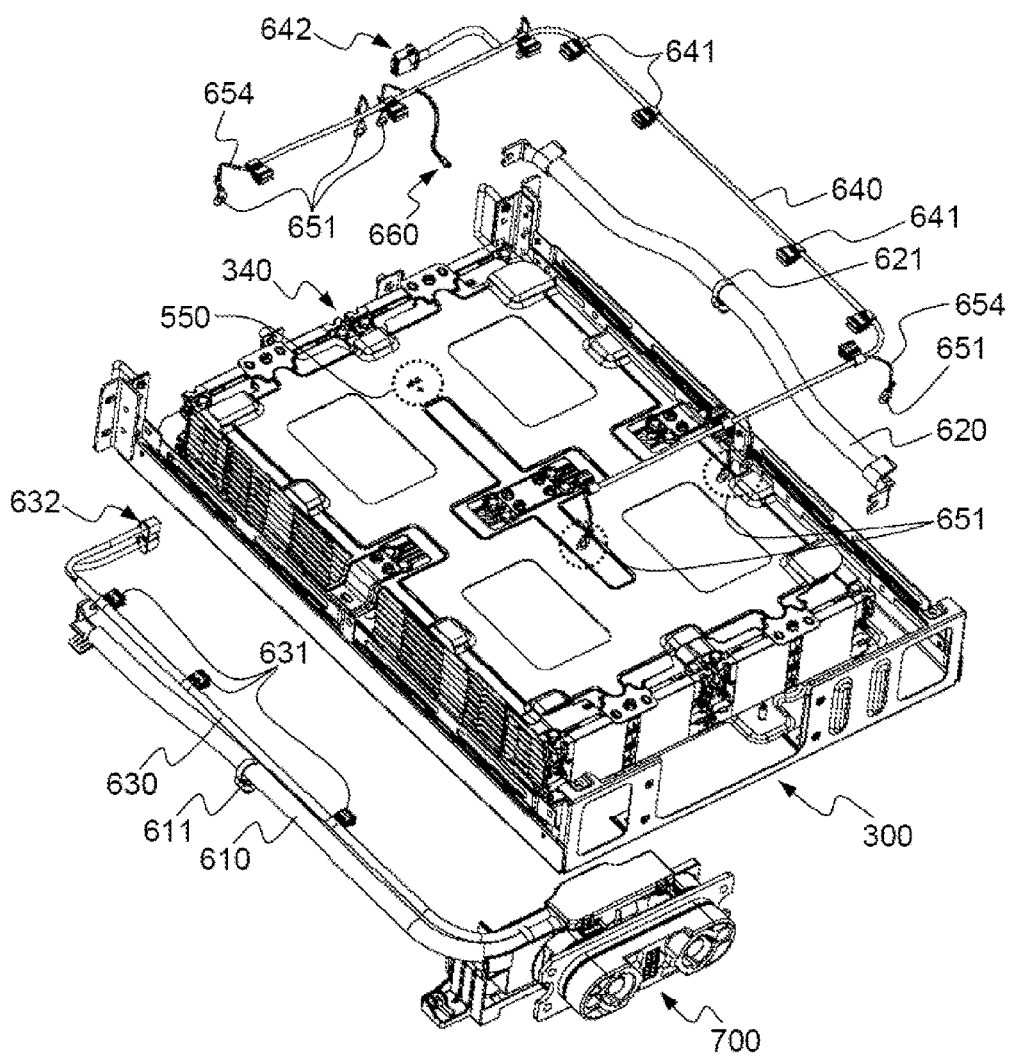

[FIG. 15]
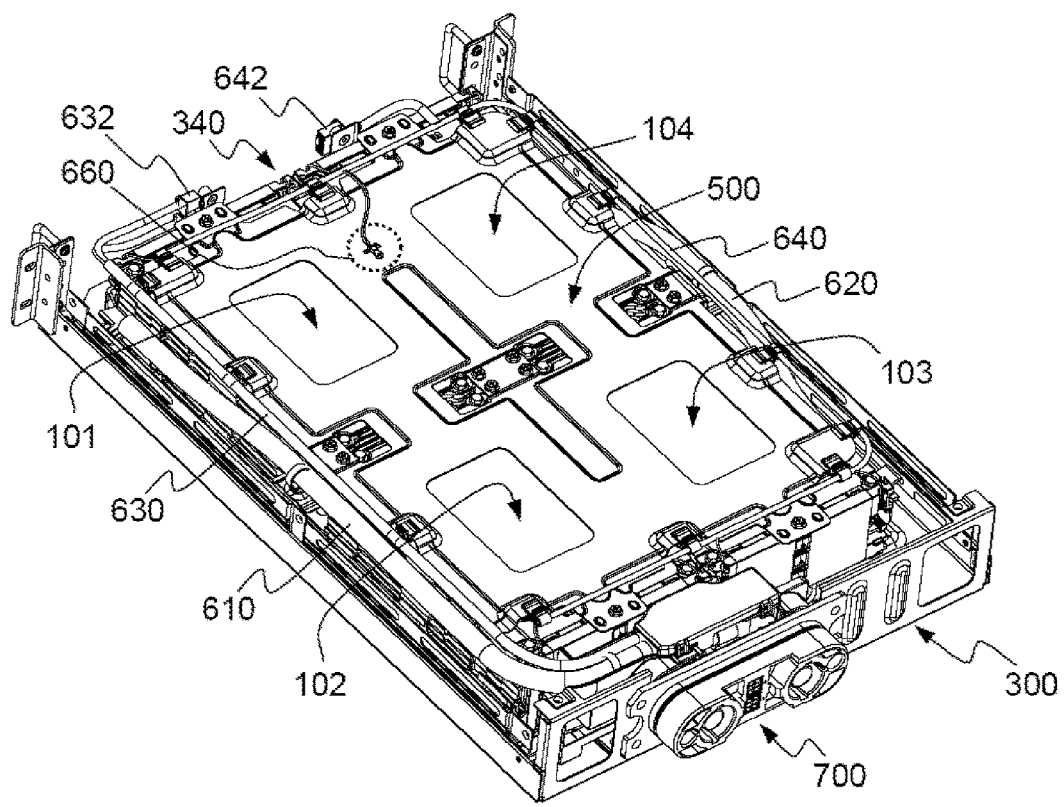

【FIG. 16】
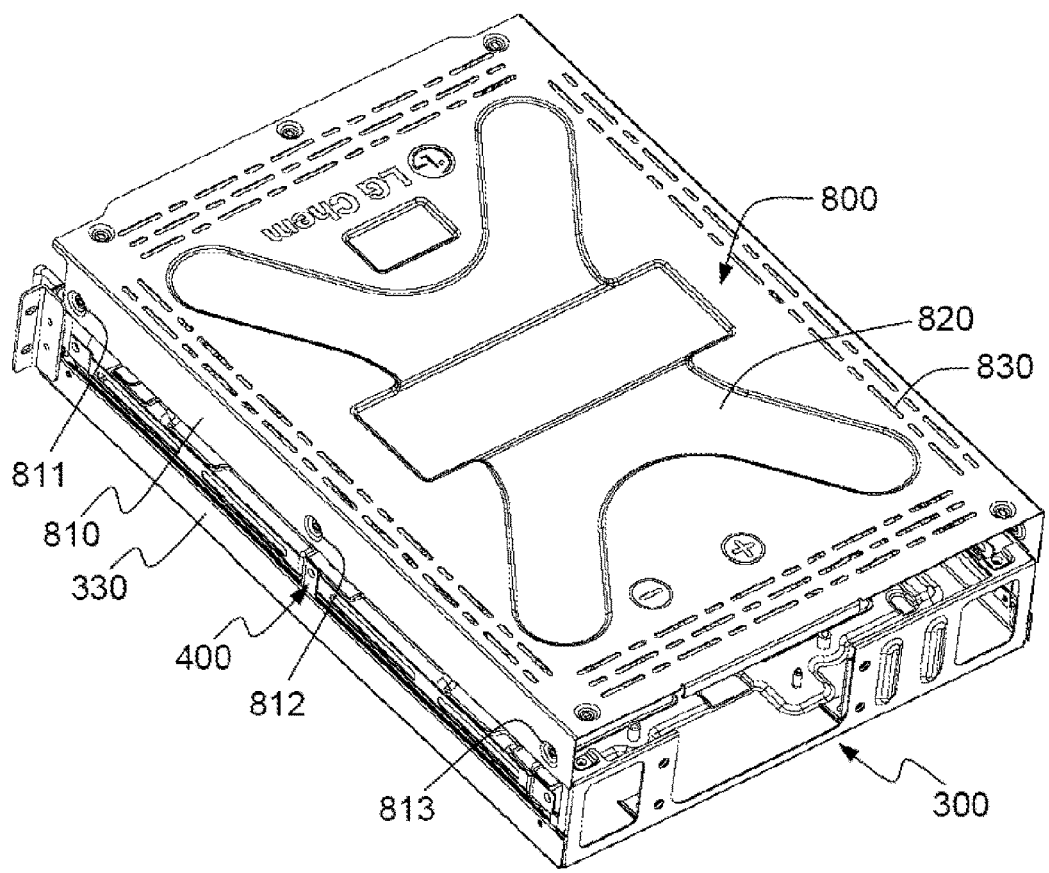

BATTERY MODULE ASSEMBLY WITH NOVEL STRUCTURE

TECHNICAL FIELD

The present invention relates to a battery module assembly having a novel structure, and more particularly to a battery module assembly including two or more battery modules, each of which includes two or more plate-shaped battery cells vertically stacked such that electrode leads of the battery cells are arranged in one direction, a base plate including module receiving parts, on tops of which the battery modules are loaded in a state in which electrode terminals of the battery modules are arranged in one direction, the base plate being provided at an outer edge thereof with upwardly bent side walls, an upper cover plate including downwardly bent side walls formed at opposite sides thereof on the basis of the electrode terminals of the battery modules, the upper cover plate being fixed on the base plate to form a top of the battery module assembly, and a plate-shaped assembly cover loaded on tops of the battery modules and coupled to the battery modules in a fastening fashion, the assembly cover including a cable fixing part for fixing a cable.

BACKGROUND ART

As mobile devices have been increasingly developed, and the demand for such mobile devices has increased, the demand for secondary batteries has also sharply increased. Among such secondary batteries is a lithium secondary battery exhibiting high energy density and operating voltage and excellent charge retention and service-life characteristics, which has been widely used as an energy source for various electronic products as well as mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

In addition, the secondary batteries have attracted considerable attention as an energy source for electric vehicles and hybrid electric vehicles, which have been developed to solve problems, such as air pollution, caused by existing gasoline and diesel vehicles using fossil fuel. As a result, the secondary batteries are being applied to an increasing number of applications owing to advantages thereof, and, in the future, the secondary batteries are expected to be applied to even more applications and products.

As applications and products, to which the secondary batteries are applicable, are increased, kinds of batteries are also increased such that the batteries can provide outputs and capacities corresponding to the various applications and products. In addition, there is a strong need to reduce the size and weight of the batteries applied to the corresponding applications and products.

For example, small-sized mobile devices, such as mobile phones, personal digital assistants (PDA), digital cameras, and laptop computers, use one or several small-sized, lightweight battery cells for each device according to the reduction in size and weight of the corresponding products. On the other hand, middle or large-sized devices, such as electric bicycles and hybrid electric vehicles, use a battery module (which may also be referred to as a "middle or large-sized battery pack") having a plurality of battery cells electrically connected with each other because high output and large capacity are necessary for the middle or large-sized devices. The size and weight of the battery module is directly related to an accommodation space and power of the corresponding middle or large-sized device. For this reason, manufacturers are trying to manufacture small-sized, lightweight battery modules.

Conventionally, on the other hand, a plurality of battery modules is fixed as follows. The battery modules are stacked, fixing plates are mounted at the upper and lower ends of the battery module assembly to fix the battery modules, and the battery modules are fixed again in a frame. In this method, however, overall volume of the battery module assembly is increased. In addition, in a case in which an individual plate is provided to fix an individual battery module, overall rigidity of the battery module assembly is lowered. As a result, it is necessary to provide an additional reinforcement member. Furthermore, in a case in which an additional bracket structure is provided for cables connected to the battery modules, the number of components constituting the battery module assembly is increased, and work may be not efficiently performed in a narrow space.

Therefore, there is a high necessity for technology that is capable of fundamentally solving the above problems.

DISCLOSURE

Technical Problem

The present invention has been made to solve the above problems and other technical problems that have yet to be resolved.

As a result of a variety of extensive and intensive studies and experiments to solve the problems as described above, the inventors of the present application have developed a battery module assembly having a novel structure configured to have a specific structure in which battery modules, an assembly cover, and an upper cover plate are mounted at a base plate including receiving parts, thereby restraining the increase in volume of the battery module assembly and improving rigidity of the battery module assembly, and the battery modules and cables disposed in the battery modules are stably fastened and fixed.

Therefore, it is an object of the present invention to provide a battery module assembly having a novel structure in which the battery module assembly is assembled such that the battery module assembly has a compact structure, and members received in the battery module assembly are stably fixed, thereby simultaneously improving safety and efficiency of the production process.

Technical Solution

In accordance with one aspect of the present invention, the above and other objects can be accomplished by the provision of a battery module assembly including two or more battery modules, each of which includes two or more plate-shaped battery cells vertically stacked such that electrode leads of the battery cells are arranged in one direction, a base plate including module receiving parts, on tops of which the battery modules are loaded in a state in which electrode terminals of the battery modules are arranged in one direction, the base plate being provided at an outer edge thereof with upwardly bent side walls, an upper cover plate including downwardly bent side walls formed at opposite sides thereof on the basis of the electrode terminals of the battery modules, the upper cover plate being fixed on the base plate to form a top of the battery module assembly, and a plate-shaped assembly cover loaded on tops of the battery modules and coupled to the battery modules in a fastening fashion, the assembly cover including a cable fixing part for fixing a cable.

The base plate, the upper cover plate, and the assembly cover of the battery module assembly according to the present invention each have a specific structure. Consequently, it is possible to stably mount and fix the battery modules to the module receiving parts of the base plate in a state in which the battery module assembly has a compact structure. In addition, it is possible to improve overall rigidity of the battery module assembly and to stably fasten and fix cables disposed on the base plate.

In addition, it is not necessary to provide an additional component during an assembly process of the battery module assembly according to the present invention. Consequently, it is possible to improve efficiency of a production process together with the effect of the compact structure. Furthermore, it is possible to stably fix the battery modules and to easily mount and fix the components, such as the cables and the upper cover plate, thereby simultaneously improving safety and efficiency of the production process.

In a preferred example, each of the battery cells may be a prismatic secondary battery or a pouch-shaped secondary battery.

The prismatic secondary battery may be configured to have a structure in which an electrode assembly is mounted in a prismatic metal case in a sealed state, and the pouch-shaped secondary battery may be configured to have a structure in which an electrode assembly is mounted in a laminate sheet including a resin layer and a metal layer in a sealed state.

The secondary battery may be a lithium secondary battery exhibiting high energy density, discharge voltage, and output stability. Other components of the lithium secondary battery will hereinafter be described in detail.

In general, the lithium secondary battery includes a positive electrode, a negative electrode, a separator, and a non-aqueous electrolytic solution containing lithium salt.

The positive electrode may be manufactured, for example, by applying a mixture of a positive electrode active material, a conductive agent, and a binder to a positive electrode current collector and drying the mixture. A filler may be further added to the mixture as needed. On the other hand, the negative electrode may be manufactured by applying a mixture of a negative electrode active material and a binder to a negative electrode current collector and drying the mixture. The above-mentioned ingredients may be further included as needed.

The separator is disposed between the negative electrode and the positive electrode. The separator may be made of an insulative thin film exhibiting high ion permeability and mechanical strength.

The non-aqueous electrolytic solution containing lithium salt consists of a non-aqueous electrolyte and lithium salt. A liquid non-aqueous electrolytic solution, a solid electrolyte, or an inorganic solid electrolyte may be used as the non-aqueous electrolyte.

The current collectors, the electrode active materials, the conductive material, the binder, the filler, the separator, the electrolytic solution, and the lithium salt are well known in the art to which the present invention pertains, and therefore a detailed description thereof will be omitted.

The lithium secondary battery may be manufactured using an ordinary method well known in the art to which the present invention pertains. That is, the lithium secondary battery may be manufactured by disposing a porous separator between a positive electrode and a negative electrode and injecting an electrolytic solution thereinto.

The positive electrode may be manufactured, for example, by applying a slurry containing a lithium transition metal oxide active material, a conductive material, and a binder to a current collector and drying the applied slurry. In the same manner, the negative electrode may be manufactured, for example, by applying a slurry containing a carbon active material, a conductive material, and a binder to a thin current collector and drying the applied slurry.

In a preferred example, each of the battery modules may be configured such that the battery cells are connected in parallel to each other.

Specifically, the parallel connection between the battery cells may be achieved using a ']'-shaped or '['-shaped bus bar.

The battery cells may be fixed to a cartridge frame, and each of the battery modules may be configured to have a structure in which cartridge frames are stacked.

The cartridge frame is a structure exhibiting predetermined rigidity. The cartridge frame protects the battery cells from external impact and secures stable mounting of the battery cells. In addition, the battery cells are arranged such that electrode leads of the battery cells are directed to one side by the cartridge frame. Consequently, it is possible to more easily achieve electrical parallel connection between the battery cells via the bus bar.

In addition, the electrode leads of the battery cells electrically connected in parallel to each other via the bus bar may be connected to electrode terminals, and the electrode terminals may be disposed at the same side as the side at which the electrode leads are arranged. Consequently, a battery module configured to have a structure in which battery cells are fixed to a cartridge frame, and cartridge frames are stacked may be electrically connected to another battery module via electrode terminals formed at one side of each of the battery modules. In addition, a detection member for voltage detection may be easily mounted at each battery module.

In addition, the battery modules may be provided with fastening holes for fastening with the assembly cover. Consequently, the battery modules may be loaded on the tops of the module receiving parts formed at the base plate and, at the same time, fastened to the assembly cover, thereby achieving more secure and stable fixing. In addition, fastening between the battery modules and the assembly cover through the fastening holes may be achieved using bolts or rivets. However, the present invention is not limited thereto.

In another preferred example, each of the battery modules may further include an electrically insulative module cover mounted on the electrode leads of the battery cells and fixed to the base plate and an assembly cover in a fastening fashion.

Consequently, the module cover protects the electrode leads of the battery cells from external impact. In addition, the module cover electrically isolates the battery module assembly from the outside since the module cover is made of an electrically insulative material.

The module cover may include a first hook for fixing cables connected to the electrode terminals of each of the battery modules, an upward protrusion for positioning fixedly engaged with the assembly cover, and a second hook mounted and fixed to each of the battery modules.

Specifically, the first hook includes one or more protruding parts for holding and fixing cable terminals and cables. When the cable terminals and the cables are electrically connected to each other, therefore, it is possible to prevent release of the connections between the cable terminals and the cables from the battery module assembly or rotation of the cable terminals. In addition, it is possible to more rapidly assemble the battery modules in a process of assembling the battery module assembly and to secure a safer production process.

Furthermore, it is possible to more rapidly assemble the battery modules since the module cover includes the second hook that can be easily mounted to and separated from each of the battery modules. In addition, the module cover is made of a material exhibiting predetermined rigidity. Consequently, it is possible for the module cover to integrate the plate-shaped battery cells stacked in each of the battery modules and, at the same time, to protect each of the battery modules from external impact. Furthermore, the battery module integrated by the module cover may be integrated with the assembly cover since the module cover includes the upward protrusion that can be fixed to a predetermined position of the assembly cover.

In addition, the module cover may further include an insulative protection cover for electrically isolating the electrode terminals of each of the battery modules from the outside.

Specifically, the connections between the cable terminals and the cables are electrically exposed to the outside. For this reason, it is necessary to provide an additional electrically isolating member. The insulative protection cover may perform the above-mentioned function.

The insulative protection cover may include one or more connection parts that can be easily mounted to or separated from the module cover. The connection parts may be, for example, hook type connection parts.

Consequently, the insulative protection cover may secure a safer assembly process of the battery module assembly.

The module cover may further include a bushing insertion hole, through which the module cover is mounted and fixed to the base plate.

Specifically, the module cover may further include a bushing insertion hole, through which the module cover is fastened and fixed to the upper cover plate and the base plate. The module cover is fastened and fixed to the upper cover plate and the base plate by a bushing inserted into the bushing insertion hole and fastening members. The fastening members may be bolts. However, the present invention is not limited thereto.

Consequently, the battery module integrated with the module cover is stably mounted and fixed to the base plate through the bushing insertion hole, and therefore, the battery module assembly may exhibit stable and desired rigidity.

In a preferred example, the base plate and the upper cover plate may be fixed to each other via brackets.

Specifically, each of the brackets may have one side coupled to a corresponding side wall of the base plate in a welding fashion and the other side coupled to a corresponding one of the side walls of the upper cover plate in fastening fashion.

Fastening between the upper cover plate and the brackets may be achieved using elastic deformation of the upper cover plate. To this end, protruding parts may be formed at the side walls of the upper cover plate, and depressed parts having sizes corresponding to the protruding parts may be formed at side walls of the brackets such that the protruding parts of the upper cover plate can coupled into the depressed parts of the brackets in a fastening fashion.

The protruding parts may include fastening holes, and the depressed parts may include fastening holes corresponding to the fastening holes of the protruding parts such that fastening members can be inserted through the fastening holes of the protruding parts and the depressed parts to achieve fastening and fixing between the protruding parts and the depressed parts.

Consequently, the upper cover plate may be easily located at the brackets due to elasticity of the upper cover plate, thereby more easily performing a fastening assembly process.

Meanwhile, the assembly cover may be provided with openings, through which the tops of the battery modules are exposed, the opening being formed, for example, by drilling.

Consequently, the tops of the battery modules are partially exposed to the outside in a state in which the battery modules are located and fixed to the base plate via the assembly cover. Heat generated from the battery modules can be easily dissipated to the outside through the openings. The openings may be drilled to have a predetermined rate corresponding to the area of the tops of the battery modules. The openings may each be configured to have a quadrangular shape or other shapes.

In a preferred example, the cable may include a power cable of the battery module assembly, a voltage detection cable for detecting voltages of the battery modules, and a communication cable for controlling the battery module assembly.

In addition, the cable may be fixed by the cable fixing part. For example, the cable fixing part may include at least one first cable fixing part for fixing a power cable, the first cable fixing part extending from an end of the assembly cover, and the first cable fixing part may be configured to have an 'L'-shaped structure in vertical section.

Consequently, it is possible for the cable fixing part to stably fix the power cable in the battery module assembly and, in addition, to secure a safer process of assembling the battery module assembly.

In addition, the cable fixing part may include at least one second cable fixing part for fixing a voltage detection cable or a communication cable via a band clip, the first cable fixing part being bent upward from an end of the assembly cover.

The band clip may include a grip coupled to the second cable fixing part while fixing the cable.

Specifically, the band clip may be made of a material exhibiting predetermined elasticity. Consequently, the band clip is coupled to the cable through deformation and restoration due to elasticity of the band clip. In addition, the structure of the cable fixing part for fixing the cable is not particularly restricted so long as the cable fixing part uses its own elasticity. For example, the cable fixing part may be formed in a C shape, in which the cable fixing part can wrap the cable, when viewed in a lateral direction.

Consequently, it is possible for the cable fixing part to stably fix cables in the battery module assembly when configuring the battery module assembly and to provide an easier assembly process of the battery module assembly. In addition, the cable fixing part and the band clip are made of members exhibiting predetermined rigidity. Consequently, the cables in the battery module assembly can remain stably mounted and fixed even when external vibration and impact are applied to the battery module assembly, thereby improving safety of a finished product.

In a preferred example, the assembly cover may further include a temperature sensor fixing part for fixing a temperature sensor for detecting temperature of the battery cells or the battery modules.

The temperature sensor fixing part is provided at a position at which the temperature sensor fixed by the temperature sensor fixing part can be easily mounted. For example, the temperature sensor fixing part may be provided at a central part of the top of the assembly cover. Alternatively, the temperature sensor fixing part may be a predetermined distance from the central part of the top of the assembly cover in consideration of a positional relationship between the temperature sensor fixing part and another member received in the battery module assembly.

Consequently, the temperature sensor fixed by the temperature sensor fixing part can easily detect temperature of the battery module fixed to the assembly cover without deviation. In addition, the temperature sensor is not mounted at each of the battery modules but is mounted at the integrated assembly cover. Consequently, it is not necessary to provide an additional member for mounting the temperature sensor.

According to circumstances, the assembly cover may further include fastening grooves, by which a module cover of each of the battery modules is coupled to the assembly cover.

Consequently, the battery modules may be fastened to the assembly cover and, at the same time, may be loaded on the tops of the module receiving parts formed at the base plate, thereby achieving more secure and stable fixing. In addition, fastening between the battery modules and the assembly cover through the fastening holes may be achieved using bolts or rivets. However, the present invention is not limited thereto.

In accordance with another aspect of the present invention, there is provided a device including the battery module assembly with the above-stated construction as a power source. Specifically, the device may be a power supply for emergency, a power supply for computer rooms, a portable power supply, a power supply for medical facilities, a power supply for fire extinguishing facilities, a power supply for alarm facilities, or a power supply for refuge facilities. However, the present invention is not limited thereto.

The structure and manufacturing method of the device are well known in the art to which the present invention pertains, and therefore a detailed description thereof will be omitted.

BRIEF DESCRIPTION OF DRAWINGS

The above and other objects, features and other advantages of the present invention will be more clearly understood from the following detailed description taken in conjunction with the accompanying drawings, in which:

FIG. 1 is a plan view showing a pouch-shaped battery cell according to the present invention;

FIG. 2 is a perspective view showing that battery cells, one of which is shown in FIG. 1, are mounted at a cartridge frame;

FIG. 3 is a perspective view showing a battery module assembled by stacked cartridge frames, one of which is shown in FIG. 2;

FIGS. 4 and 5 are perspective views showing that a module cover is mounted at the battery module of FIG. 3;

FIG. 6 is a front enlarged view showing an electrode terminal part of a module cover according to the present invention;

FIG. 7 is a front enlarged view showing that an insulative protection cover is mounted at the module cover of FIG. 6;

FIG. 8 is a front view showing the module cover according to the present invention;

FIG. 9 is a perspective view showing that brackets are mounted at a base plate according to the present invention;

FIG. 10 is a perspective view showing a bracket according to the present invention;

FIG. 11 is a perspective view showing that battery modules are located on the base plate of FIG. 9;

FIG. 12 is a perspective view showing an assembly cover according to the present invention;

FIG. 13 is a perspective view showing that the assembly cover is mounted at the top of the battery module of FIG. 11;

FIGS. 14 and 15 are perspective views showing that cables are mounted at the upper end of the assembly cover of FIG. 13; and FIG. 16 is a perspective view showing that an upper cover plate is mounted at the base plate of FIG. 9.

BEST MODE

Now, exemplary embodiments of the present invention will be described in detail with reference to the accompanying drawings. It should be noted, however, that the scope of the present invention is not limited by the illustrated embodiments.

FIG. 1 is a plan view showing a plate-shaped battery cell 10 having electrode leads 11 and 12 formed at one end thereof.

Referring to FIG. 1, the battery cell 10 is a plate-shaped battery cell 10 having electrode leads 11 and 12 formed at one end thereof. Specifically, the plate-shaped battery cell 10 is configured to have a structure in which an electrode assembly (not shown) is mounted in a pouch-shaped battery case 13 made of a laminate sheet including a metal layer (not shown) and a resin layer (not shown). The plate-shaped battery cell 10 may be generally referred to as a pouch-shaped battery cell 10.

FIG. 2 is a perspective view showing that battery cells 10 and 20 are mounted at a cartridge frame 31, and FIG. 3 is a perspective view showing a battery module 100 assembled by cartridge frames 31 to 38.

Referring to these figures, the battery cells 10 and 20 are mounted at the cartridge frame 31, and the cartridge frames 31 to 38 are fixed to a cartridge frame upper end cover 111 and a cartridge frame lower end cover 112 by bolts 121, 122, 123, and 124 to constitute the battery module 100. In addition, the electrode leads 11 and 12 of the battery cells 10 and 20 mounted at the respective cartridge frames 31 to 38 are arranged at one side of the battery module 100 and are electrically connected in parallel to each other via '['-shaped bus bars 131 and 141. In addition, the electrode leads 11 and 12 electrically connected in parallel to each other are connected to a positive electrode terminal 130 and a negative electrode terminal 140, respectively.

FIGS. 4 and 5 are perspective views showing that a module cover 200 is mounted at the battery module 100 of FIG. 3.

Referring to these figures, protruding parts 151 and 152 each having a hook structure are formed at each edge of one side of the battery module at which the module cover 200 is mounted. In addition, the module cover 200 is provided with second hooks 211 and 212 corresponding to the protruding parts 151 and 152.

In the hook structure, engagement and disengagement are very easily performed. In an assembly process of the battery module 100, therefore, work efficiency is improved.

FIG. 6 is a front enlarged view showing an electrode terminal part of a module cover 200 according to an embodiment of the present invention, and FIG. 7 is a front enlarged view showing that an insulative protection cover 260 is mounted at the module cover 200 of FIG. 6. In addition, FIG. 8 is a front view showing the module cover 200 according to the present invention.

Referring to these figures, the module cover 200 includes a first hook 230, which includes cable terminal fixing protrusions 232 and 233 and a cable end fixing protrusion 231. A cable terminal 651 is mounted at the electrode terminal 130, and a cable connection part 652 of the cable terminal 651 is fixed by the cable terminal fixing protrusions 232 and 233 of the module cover 200. In addition, cable ends 653 and 654 of a voltage detection cable 640 are fixed by the cable end fixing protrusion 231 of the module cover 200. During electrical connection between the cable connection part 652 and the cable end 653 fixed as described above, release of the cable connection part 652 or the cable end 653 from the battery module assembly or rotation of the cable connection part 652 or the cable end 653 is prevented, thereby improving efficiency of an assembly process.

In addition, the insulative protection cover 260 is mounted at the module cover 200 for protecting electrical connection between the electrode terminal 130 and the voltage detection cable 640 from the outside.

The insulative protection cover 260 includes fastening parts 261, 262, and 263 each having a hook structure. In addition, the module cover 200 is provided at positions thereof corresponding to the fastening parts 261, 262, and 263 of the insulative protection cover 260 with connection parts 241, 242, and 243 each having a hook structure. Consequently, engagement and disengagement between the module cover 200 and the insulative protection cover 260 are easily achieved.

Consequently, the module cover 200 and the insulative protection cover 260 may improve efficiency of an assembly process and, in addition, secure an electrically safer assembly process.

FIG. 12 is a perspective view showing an assembly cover according to the present invention.

Referring to FIG. 8 together with FIG. 12, the module cover 200 includes upward protrusions 251 and 252 for positioning fixed to an assembly cover 500 by engagement therebetween. In addition, the module cover 200 includes a bushing insertion hole 220, and the module cover 200 is more securely fixed to the battery module 100 through fastening holes 523 of the assembly cover 500.

FIG. 9 is a perspective view showing that brackets 400 are mounted at a base plate 300 according to the present invention, and FIG. 10 is a perspective view showing a bracket 400 according to an embodiment of the present invention.

Referring to these figures, the base plate 300 is provided with module receiving parts 301, 302, 303, and 304, on which battery modules (not shown) are loaded. In addition, upwardly protruding fastening parts 311, 312, 313, and 314 are formed at the bottom of the base plate 300. In addition, the brackets 400 are connected to upwardly bent side walls 330 formed at the outer edge of the base plate 300 by welding.

Each of the brackets 400 is provided with welding coupling parts 420 connected to a corresponding one of the side walls 330 of the base plate 300 by welding, depressed parts 401, 402, and 403 coupled to an upper cover plate (not shown) by fastening, and fastening holes 411, 412, and 413 formed at the respective depressed parts 401, 402, and 403.

FIG. 11 is a perspective view showing that battery modules 101, 102, 103, and 104 are located on the base plate 300 of FIG. 9, and FIG. 12 is a perspective view showing an assembly cover 500 according to an embodiment of the present invention. In addition, FIG. 13 is a perspective view showing that the assembly cover is mounted at the top of the battery module of FIG. 11.

Referring to these figures together with FIGS. 8 and 9, the battery modules 101, 102, 103, and 104 are located on the module receiving parts 301, 302, 303, and 304 of the base plate 300. The located battery modules 101, 102, 103, and 104 are fixed by the assembly cover 500.

Specifically, the assembly cover 500 is provided with fastening holes 512 and 540, through which upwardly protruding fastening parts 321 and 322 formed at the base plate 300 are inserted.

The module cover 200 is provided at the top thereof with upward protrusions 251 and 252, which are inserted through fastening holes 521 and 522 for positioning of the assembly cover 500. The fastening holes 521 and 522 for positioning enable the battery modules 101, 102, 103, and 104 to be correctly mounted at the assembly cover 500.

The battery modules 101, 102, 103, and 104 correctly mounted and fixed to the assembly cover 500 as described above are fixed again by bolting through the bushing insertion hole 220 formed at the module cover 200 and a bushing (not shown) mounted in the bushing insertion hole 220. Specifically, bolts, having inserted through the fastening holes 523 of the assembly cover 500 and the bushing insertion holes 220 of the respective module covers 200, are fixed to the upwardly protruding fastening parts 311, 312, 313, and 314 of the base plate to more securely fix the battery modules 101, 102, 103, and 104 fixed to the module covers 200.

FIGS. 14 and 15 are perspective views showing that cables are mounted at the upper end of the assembly cover of FIG. 13.

Referring to these figures together with FIG. 12, power cables 610 and 620, a voltage detection cable 640, and a communication cable 630 are mounted and fixed to fixing parts 511 and 530 of the assembly cover 500 by band clips 611, 621, 641, and 631.

Specifically, the power cables 610 and 620 are fixed by the band clips 611 and 621, and the band clips are mounted at first cable fixing parts 511 of the assembly cover 500. Each of the first cable fixing parts 511 is configured to have an 'L'-shaped structure 510 in vertical section such that the band clips 611 and 621 can easily be mounted and fixed to the first cable fixing parts 511.

The voltage detection cable 640 and the communication cable 630 are fixed by the band clips 641, and the band clips are mounted and fixed to second cable fixing parts 530 of the assembly cover 500.

A temperature sensor 660 is separated from the voltage detection cable 640 and mounted and fixed to a temperature sensor fixing part 550 of the assembly cover 500.

A battery management system (BMS) (not shown) is mounted at a central part 340 of the rear of the base plate 300, and a connection terminal 642 of the voltage detection cable 640 and a connection terminal 632 of the communication cable 630 are connected to terminal parts (not shown) of the BMS.

In addition, a plug-in connector 700, which is configured to have a housing structure in which ends of the power cable 610 and the communication cable 630 are concentrated, is mounted at a central part of the front of the base plate 300.

Since various components are assembled in the plug-in connector 700 having the housing structure, the number of components constituting the battery module assembly is reduced, an assembly process and management are easily performed, and the internal space of the battery module assembly is efficiently used. In addition, the power cable 610 and a bus bar (not shown) are separated from each other by the insulative housing member. Consequently, it is possible to prevent the occurrence of a short circuit, which may be caused during the assembly process.

FIG. 16 is a perspective view showing that an upper cover plate 800 is mounted at the base plate 300 of FIG. 9.

Referring to FIG. 16 together with FIGS. 9 and 10, the upper cover plate 800 is provided with downwardly bent side walls 810, which are coupled to the base plate 300 via the brackets 400 mounted at the base plate 300.

Specifically, the upper cover plate 800 includes protruding parts 811, 812, and 813 corresponding to the depressed parts 401, 402, and 403 formed at the brackets 400. The protruding parts 811, 812, and 813 include fastening holes (not shown) fastened to the fastening holes 411, 412, and 413 of the depressed parts 401, 402, and 403 by bolting.

Fastening between the upper cover plate 800 and the brackets 400 is achieved using elastic deformation of the upper cover plate 800. The upper cover plate 800 is easily correctly located at the brackets 400 due to elasticity of the upper cover plate 800, thereby more easily performing a fastening assembly process.

In addition, the upper cover plate 800 is provided at the outer surface thereof with a reinforcement bead 820 for improving rigidity of the upper cover plate 800, and the upper cover plate 800 is provided at an outer edge thereof with a plurality of ventilation openings 830. The ventilation openings 830 are arranged along the outer edge of the upper cover plate 800.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, a battery module assembly according to the present invention is configured to have a structure in which battery modules, an assembly cover, and an upper cover plate are mounted at a base plate including receiving parts. Consequently, it is possible to restrain the increase in volume of the battery module assembly, to improve rigidity of the battery module assembly, and to stably fasten and fix the battery modules and cables disposed in the battery modules. In addition, it is possible to assemble the battery module assembly such that the battery module assembly has a compact structure, to stably fix members received in the battery module assembly, and to simultaneously improve safety and efficiency of a production process.

The invention claimed is:

1. A battery module assembly comprising:
two or more battery modules, each of which comprises two or more plate-shaped battery cells vertically stacked such that electrode leads of the battery cells are arranged in a horizontal direction;
a base plate comprising module receiving parts, on tops of which the battery modules are loaded in a state in which electrode terminals of the battery modules are arranged in the horizontal direction, the base plate being provided at an outer edge thereof with upwardly bent side walls;
an upper cover plate comprising downwardly bent side walls formed at opposite sides thereof on the basis of the electrode terminals of the battery modules, the upper cover plate being fixed on the base plate to form a top of the battery module assembly; and
a plate-shaped assembly cover loaded on tops of the battery modules and coupled to the battery modules in a fastening fashion, the assembly cover comprising a cable fixing part for fixing a cable,
wherein the base plate is provided with upwardly protruding fastening parts located between adjacent module receiving parts,
wherein the assembly cover is provided with fastening holes,
wherein the upwardly protruding fastening parts of the base plate are provided inside the fastening holes of the assembly cover, and
wherein the horizontal direction is parallel to a top surface of the base plate, on the surface which the battery modules are loaded.

2. The battery module assembly according to claim 1, wherein each of the battery cells is a prismatic secondary battery or a pouch-shaped secondary battery.

3. The battery module assembly according to claim 2, wherein the pouch-shaped secondary battery is configured to have a structure in which an electrode assembly is mounted in a laminate sheet comprising a resin layer and a metal layer in a sealed state.

4. The battery module assembly according to claim 1, wherein each of the battery modules is configured such that the battery cells are connected in parallel to each other.

5. The battery module assembly according to claim 4, wherein the parallel connection between the battery cells is achieved using a ']'-shaped or '['-shaped bus bar.

6. The battery module assembly according to claim 1, wherein the battery cells are fixed to a cartridge frame, and each of the battery modules is configured to have a structure in which cartridge frames are stacked.

7. The battery module assembly according to claim 1, wherein the battery modules are provided with fastening holes for fastening with the assembly cover.

8. The battery module assembly according to claim 1, wherein each of the battery modules further comprises an electrically insulative module cover mounted on the electrode leads of the battery cells and fixed to the base plate and the assembly cover in a fastening fashion.

9. The battery module assembly according to claim 8, wherein the electrically insulative module cover comprises:
a first hook for fixing cables connected to the electrode terminal of the battery module;
an upward protrusion for positioning fixedly engaged with the assembly cover; and
a second hook mounted and fixed to the battery module.

10. The battery module assembly according to claim 8, wherein the electrically insulative module cover further comprises an insulative protection cover for protecting the electrode terminals of each of the battery modules from an outside.

11. The battery module assembly according to claim 8, wherein the electrically insulative module cover further comprises a bushing insertion hole, through which the module cover is mounted and fixed to the base plate.

12. The battery module assembly according to claim 1, wherein the base plate and the upper cover plate are fixed to each other via brackets.

13. The battery module assembly according to claim 12, wherein each of the brackets has one side coupled to a corresponding side wall of the base plate in a welding fashion and the other side coupled to a corresponding one of the side walls of the upper cover plate in fastening fashion.

14. The battery module assembly according to claim 1, wherein the assembly cover is provided with openings, through which the tops of the battery modules are exposed, the openings being formed by drilling.

15. The battery module assembly according to claim 1, wherein the cable comprises a power cable of the battery module assembly, a voltage detection cable for detecting voltages of the battery modules, and a communication cable for controlling the battery module assembly.

16. The battery module assembly according to claim 1, wherein the cable fixing part comprises at least one first cable fixing part for fixing a power cable, the first cable fixing part extending from an end of the assembly cover.

17. The battery module assembly according to claim 16, wherein the first cable fixing part is configured to have an 'L'-shaped structure in vertical section.

18. The battery module assembly according to claim 16, wherein the cable fixing part comprises at least one second cable fixing part for fixing a voltage detection cable or a communication cable via a band clip, the second cable fixing part being bent upward from an end of the assembly cover.

19. The battery module assembly according to claim 18, wherein the band clip comprises a grip coupled to the second cable fixing part while fixing the cable.

20. The battery module assembly according to claim 1, wherein the assembly cover further comprises a temperature sensor fixing part for fixing a temperature sensor for detecting temperature of the battery cells or the battery modules.

21. The battery module assembly according to claim 1, wherein the assembly cover further comprises fastening grooves, by which a module cover of each of the battery modules is coupled to the assembly cover.

22. A device comprising a battery module assembly according to claim 1 as a power source.

23. The device according to claim 22, wherein the device is a power supply for emergency, a power supply for computer rooms, a portable power supply, a power supply for medical facilities, a power supply for fire extinguishing facilities, a power supply for alarm facilities, or a power supply for refuge facilities.

* * * * *